United States Patent

Bacon

[15] 3,693,911
[45] Sept. 26, 1972

[54] AIRCRAFT FOR VERTICAL FLIGHT AND TRANSITION TO AND FROM HORIZONTAL FLIGHT

[72] Inventor: Henry S. Bacon, 745 W. Front St., Red Bank, N.J. 07701

[22] Filed: Oct. 18, 1971

[21] Appl. No.: 190,076

Related U.S. Application Data

[63] Continuation-in-part of Ser. No. 51,601, July 1, 1970, abandoned.

[52] U.S. Cl. ................................................244/7 A
[51] Int. Cl. ............................................B64c 27/22
[58] Field of Search ....................244/7 R, 7 A, 6

[56] References Cited

UNITED STATES PATENTS

3,246,861  4/1966  Curci ........................244/7 A
3,410,506  11/1968  Hayes ........................244/7

Primary Examiner—Milton Buchler
Assistant Examiner—Carl A. Rutledge
Attorney—Howard T. Jeandron

[57] ABSTRACT

This invention is particularly concerned with an aircraft capable of both horizontal and vertical flight and at any required angle and supported by powered wing-rotors that are rotationally synchronized for stability while producing a desired vertical lift as the aircraft ascends and is propelled forward by means of auxiliary engines, and in addition, means are provided to convert said wing-rotors into stationary wing airfoils for normal horizontal flight at greater speed and reconversion to wing-rotors for vertical landing.

21 Claims, 14 Drawing Figures

INVENTOR.
HENRY S BACON

BY Howard T. Jeandron

AGENT

INVENTOR
HENRY S. BACON
BY
Howard T. Jeandron
AGENT

AIRCRAFT FOR VERTICAL FLIGHT AND TRANSITION TO AND FROM HORIZONTAL FLIGHT

This invention is a continuation-in-part of my previously filed application, Ser. No. 51,601 filed July 1, 1970.

This invention relates to a heavier-than-aircraft and more particularly to an aircraft capable of either vertical or angled flight and a smooth transition to normal horizontal flight at increased speed and a transition back to vertical, or angled descent at destination.

The presently known prior art illustrates many examples of aircraft designed with propellor rotating engines and/or jet reaction engines for vertical flight and many examples of aircraft designed for horizontal flight as well as the more recently designed aircraft provided with means to take off vertically and continue in flight with a change of flight to a forward and horizontal attitude. The most recently developed aircraft of this design depends upon jet motors that are rotated to point downward for takeoff providing a downward jet force resulting in an upward movement of the aircraft and after attaining a desired elevation, the jet motors are slowly rotated to provide the desired thrust for forward flight.

It is an object of this invention to provide means to produce a vertical lift of a heavier-than-aircraft and with the same power means, transform the vertical flight to horizontal flight.

It is a further object of this invention to provide power rotated wing-rotors positioned and supported on a turntable on each horizontal spar to produce vertical flight with means to convert the power producing vertical flight to also produce horizontal flight.

It is a further object of this invention to provide engines that are rotatably mounted for propulsion and are controlled both horizontally and vertically to direct their propulsive power for normal forward flight, or for maneuvering of the craft in the air and on land or water after landing, or for a braking effect for slowing the movement of the craft on land or in the air.

It is a further object of this invention to provide the combination of the rotor with its supporting spar to form an integrally perfect air foil on each side of the aircraft.

It is a further object of this invention to provide a combination wing-rotor and spar on each side of the aircraft mounted on a turntable and rotatable horizontally, from a position 90° in relation to the central axis of the aircraft, to a swept back position during flight and rotatable horizontally, to a fully swept back position after landing, for space economy in storage.

A still further object of this invention is to provide horizontal maneuverability during vertical ascent or descent by using the auxiliary engines mounted on the fuselage.

A still further object of this invention is to provide projecting spar frames on each side of the aircraft to support wing rotors that are elevated above the spar for vertical flight and may be lowered and locked in alignment with each spar to form a perfect composite air foil for horizontal flight.

A still further object of this invention is to provide projecting spar frames on each side of the aircraft to support wing rotors in which the spars are designed to produce minimal resistance to the down draft generated by the rotors.

A still further object of this invention is to provide projecting spar frames on each side of the aircraft to support wing rotors that are elevated and rotated above the spars for vertical flight and in which said spar frames are provided with electromagnetic surfaces rotationally aligned with mating magnetic surfaces on the under surfaces of said wing rotors and in which said wing rotors are slowed in their rotation and lowered to said spar frames to provide magnetic contact and produce gradual braking of the wing rotors from an operational R.R.M. to a dead stop and in addition means to bring them into alignment with said spar frames to be held in a composite relationship with each other to form a wing for horizontal flight.

It is a further object of this invention to provide engine rotated wing-rotors positioned, and supported, on a turntable on each horizontal spar, to produce vertical flight with means for utilizing this same engine to also produce horizontal flight.

A still further object of this invention is to provide supporting spar frames on each side of the aircraft to support wing-rotors in which said wing-rotors are provided with electromotor-generator combinations to permit auxiliary rotation of the rotor when needed and to generate electrical energy from the rotational force produced in the operation of the rotor engines to charge a storage means for future operation of the electrical components.

Further objects of this invention may be apparent by reference to the accompanying detailed description and the drawings in which.

Figure 1:
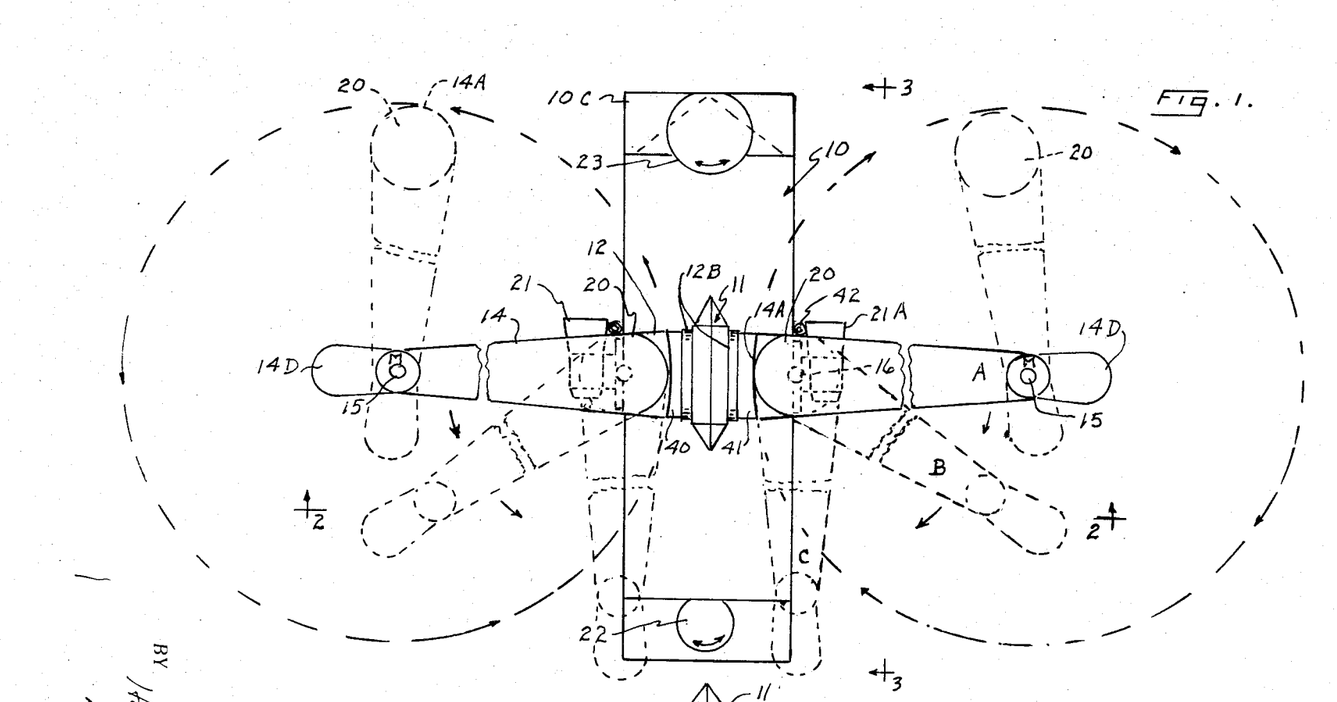
FIG. 1 is a plan view of the aircraft.
Figure 2:
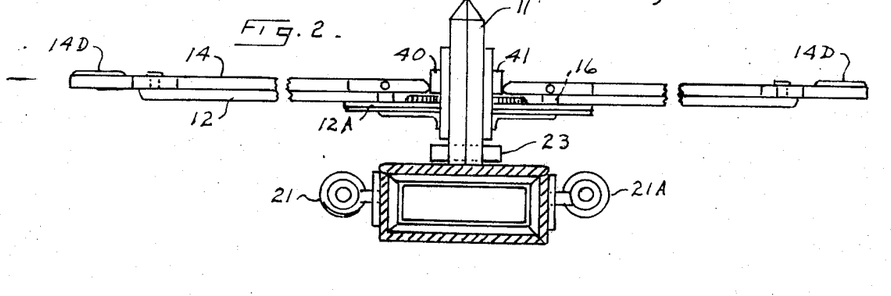
FIG. 2 is a view taken on line 2—2 of FIG. 1 shown partially in cross section.
Figures 6, 7, 10, 11:
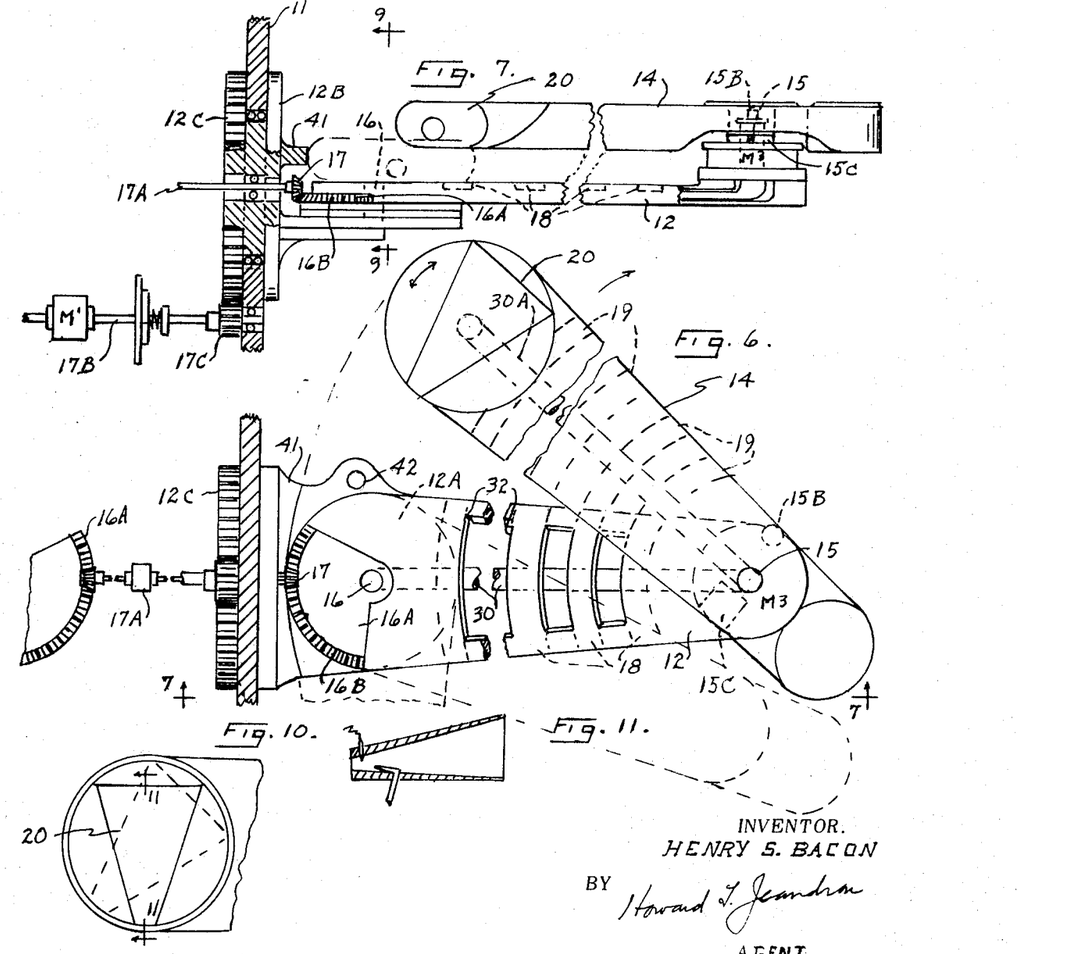
FIG. 6 is a plan view partially in cross section of one spar with rotor in a raised operational position.
FIG. 7 is a side view partially in cross section taken on line 7—7 of FIG. 6.
FIG. 10 is a plan view of jet engine.
FIG. 11 is a side cross sectional view taken on line 11—11 of FIG. 10.
Figure 8:
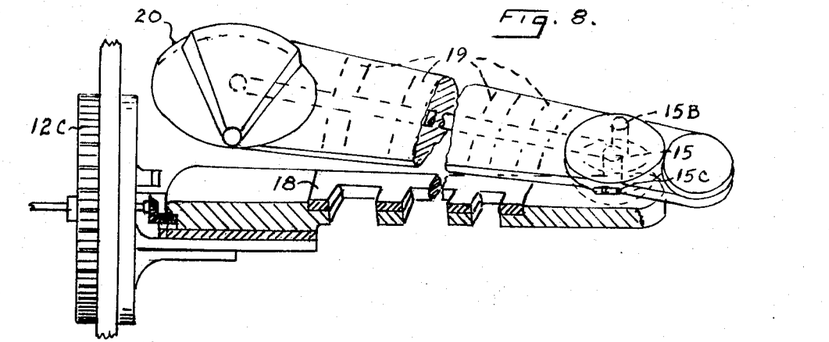
FIG. 8 is a side elevational view of the spar partially in cross section with the rotor shown in a raised position and with a proper angle of attack.
Figure 9:
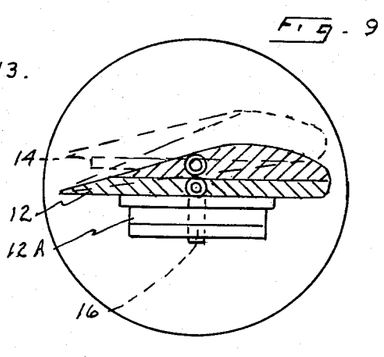
FIG. 9 is a cross sectional view taken on line 9—9 of FIG. 7.

The aircraft illustrated in the drawings is shown from a functional standpoint and is not refined to exact aerodynamic form. The aircraft is primarily of a high wing rotor combination type, with a powered sweep back wing design. The aircraft may be equipped with a plurality of electrical motors or jet engines or standard internal combustion type engines to power and control the craft. One engine is mounted to rotate each rotor and four engines may be mounted on the fuselage, one on each side and two on top, one forward and one aft. All engines are rotatably mounted and controlled for vertical and horizontal flight. The components illustrated in FIG. 1 are the aircraft body structure or fuselage 10 with a super supporting structure 11 extending vertically above the fuselage and being the main supporting and controlling center for all elements. This central control center may also be located at the center of the main body in other embodiments of this invention. The front of the fuselage is provided with a pair of airfoils 10C to provide constant lift. When jet engines are used, they direct the flow of air through the fuselage into passages 26 where the air is pre-compressed for storage in a compression chamber 26A. From chamber 26A, the pre-compressed air is compressed further and is supplied to the jet engines as needed. A pair of spars 12 are rotatably mounted one on each side of the structural supporting center 11 and a pair of combination wing-rotors 14 are mounted on turntables 15A supported on hollow shafts 15 at the end of each spar 12. This provides a high wing structure in which the wings are formed by combining the spars and wing rotors to form a perfect airfoil shape in their locked position as illustrated in FIG. 2. 2. It is to be noted, referring to FIG. 1, 1, that first the wing 14 is locked in position as illustrated in FIG. 1 (full lines before retracting to a 90° position and is also horizontally mounted to be rotatable at 16 to permit a synchronized sweep-back movement of the wing rotors from their 90° position (with relation to the axis of the body) as illustrated in FIG. 1 to a fully swept back position illustrated by dotted lines. Thus the combined spar and wing rotor may be moved from the fully extended position illustrated in FIG. 1 to any degree of sweep back in flight and for storage of the aircraft within a hangar or shelter when on land or water. The spar 12 is constructed as illustrated in FIGS. 6, 7 and 8 with open areas. The open spar is required to reduce down draft pressure generated by the rotors during flight. The wing-rotors 14 are illustrated in the horizontal flight position in FIGS. 1, 2 and 3 and in vertical flight position in FIG. 4. The wing-rotors are the means to produce lift for ascent and descent of the aircraft and are to be utilized for transition from vertical flight to horizontal flight and from horizontal to vertical flight as previously described. When the use of the wing rotors for vertical and forward flight to a desired height has been completed, a transition to horizontal flight will be accomplished as follows: a forward horizontal movement is provided with engines 21, 21A 22 and 23, and with the aircraft at a proper attitude of flight. After the forward flight is started, the wing rotors must be stopped and the mating portion 14 of the wing-rotors aligned with the spars 12 and secured as quickly as possible. In this position the composite wing-rotor is ready for horizontal flight. All engines may be accelerated and the craft flown horizontally until a landing is desired. To descend and land, the craft is flown to a spot near its destination, then the rotors are released and the rotor engines 20 are operated to drive the rotors and vertical flight or lift is restored. When forward movement has ceased, the craft may descend vertically for landing while being maneuvered in any direction with the deck mounted engines. The spars 12 are provided with a plurality of electromagnets 18 (FIGS. 6, 7 and 8) positioned in spaced relation in an arcuate pattern and the wing rotors 14 are provided with a magnetic strip material 19 also positioned in an arcuate pattern to align with the electro-magnets 18. The spars are rotatably mounted in their 90° extended position and may be mechanically rotated from a full line position (FIG. 1) to a dotted line swept back position as shown. The electro-magnets are entirely under the control of the pilot or automatically controlled when needed. When the electro-magnets are actuated, there is a braking effect caused by magnetic induction between each magnetic strip in the wing rotors and the mating magnets in the spars. In the braking of the rotor, the alignment of the magnets in one arcuate form produces an ever increasing magnetic contact as the rotor advances over the spar to increase the braking force from 0 to 100 percent as the wing rotors move to an aligned position over the spars, thus braking and decelerating and in addition abutting a positive lock 42 to be positioned with the spar as illustrated in FIGS. 2 and 6. An additional mechanical friction brake is shown in FIGS. 1 and 2 with brake shoes 40 and 41 that are expanded to contact the tips 14A of the rotors to slow and stop the wing rotors. As a security measure or factor, there is a mechanically controlled stop pin 42 at the front edge of the spar to insure the wing rotor alignment with the spar for horizontal flight. Any misalignment may be corrected with the electro-motor generator by energizing the motor to rotate the rotor in the desired direction at the same time momentarily releasing the magnetic grip.

Figures 3, 5:
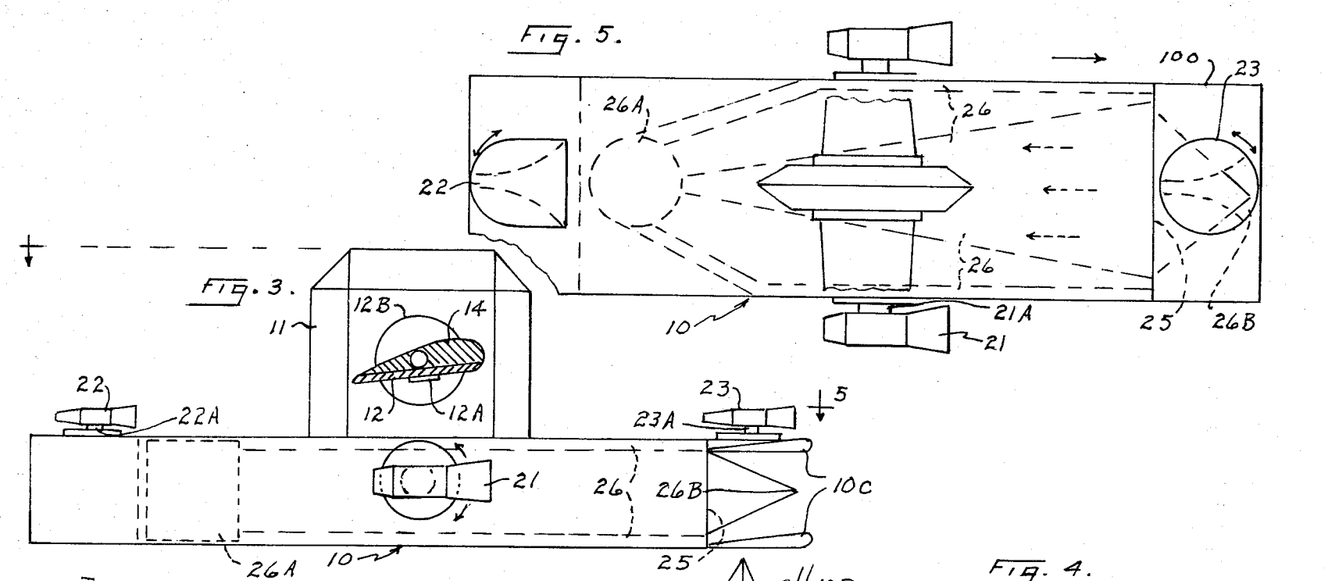
FIG. 3 is a side elevation view (slightly enlarged) taken on line 3—3 of FIG. 1.
FIG. 5 is a plan view taken on line 5—5 of FIG. 3.
Figure 4:
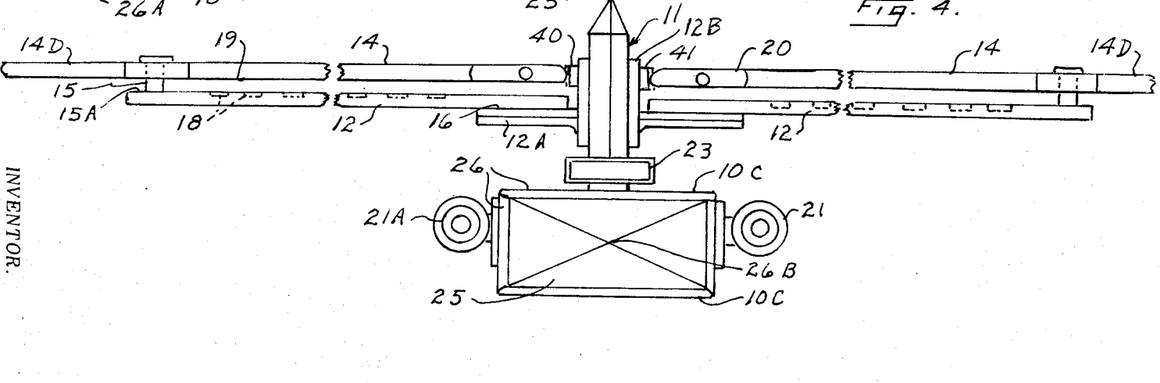
FIG. 4 is a view similar to FIG. 2 except that it illustrates the raised flight position of the rotors.

Referring to FIG. 7 there is illustrated a side elevational view of a spar 12 and its associated balanced wing-rotor 14. The balanced wing is accomplished by providing a weighted extension 14D. The wing-rotor is mounted on a shaft 15 for controlled rotation, however, in addition, a turntable 15A is designed and constructed with one hydraulic cylinder 15B mounted at the outer circumference of the turntable to provide the means to change the angle of attack of the rotor during its operation. A hinge 15C is mounted opposite the hydraulic cylinder to pivotally retain one side of the rotor. The hydraulic cylinder 15B provides the means to adjust the angular position of the rotor with relation to the spar to provide the required angle of attack. Thus while rotor 14 is rotating, its leading edge may be raised to increase the angle of attack of the blade and increase lift, during vertical, angular or horizontal flight. The cylinder 15B when retracted aligns the wing-rotors 14 with their mating spars 12, where they may be magnetically and mechanically secured to form a wing rotor. Thus with the energization of the electro-magnets, the spar and rotor alignment may be accomplished. The combination of spars 12 and wing rotors 14 become true wing-rotor airfoil structures as illustrated in FIG. 2. The rotor engines 20 are utilized to assist engines 21, 22 and 23 for directional control and in forward flight. The transition from vertical flight to horizontal flight and from horizontal flight to vertical flight for landing are as follows: For vertical flight to a desired height, the spars and the rotors must be in the position illustrated in FIG. 1 at an angle of 90° to the longitudinal axis of the fuselage 10. The wing rotor engines 20 are started with the rotor locked to the spar. When the engines 20 are functioning dependably, the rotors are released and they will rise to clear the spar in their rotation as illustrated in FIG. 4. If the engines 20 are jet engines mounted on the free end of each rotor 14 as illustrated in FIG. 1, with operation of the engines 20 and with the engine facing to produce the desired direction of rotation as illustrated in FIG. 1, the wing rotors with a zero angle of attack will rotate in a direction as illustrated by arrows, rotating on the turntable supports 15A. It is to be noted that each wing rotor 14 is a complete wing structure on one side of its supporting shaft 15 and is counterbalanced by a weighted extension 14D to provide a balanced rotatable wing. With both rotors individually balanced, if any torque is produced in flight, the one rotor counteracts the torque of the other and the aircraft retains a balance. A control is provided to increase or decrease power of the engine and a control mechanism is also provided to produce a rotative movement of engines 21, 22 and 23. Further, an additional switch controls the electro-magnets on the spars to induce the magnetic braking force or to release same. Other controls include a lever to be pulled back to actuate the motor to move both wings back in a swept back position or pushed forward to move the wings back to their 90° position as shown in the drawings. The angle of attack of the rotor blad may be The by a switch. This is electrically connected to the hydraulic circuit so that the rotor blade is increased from zero to 10°. All necessary fuel supply will be through the tube 30, shaft 15 and tube 30A (FIG. 6, to the engines 20. The side engines 21 are also mounted on the fuselage as illustrated in FIG. 1. Engines 21 are rotatable to provide directional oriented power and are controlled in their rotation. Similarly engines 22 and 23 are mounted at the rear and front respectively of the fuselage 10 and are also rotatable and controlled. the jet engines shown mounted on the wing rotors 14 will scoop in air while rotating so that the air is then dynamically compressed by convergence. In the initial lift off, the lift must remain vertical and the aircraft will rise. A rotor control stick and a directional control are also provided. The rotor control stick is eased forward while retaining the directional control in a desired position. Thus with a fixed power setting, the craft will move forward and gradually rise. With the forward and upward movement, the craft becomes airborne. The directional control may be held in one position for direction of flight while maintaining a desired lift for level flight. The power setting may be increased or decreased and thus increase or decrease lift. By means of an electrical circuit a switch will control movement of the wingrotor in axial rotation to vary the angle of attack of the wing-rotors. With this means we may produce turns in horizontal flight by increasing the angle of attack of one wing-rotor and ecreasing the angle of attack of the opposite wing-rotor and vice-versa. We may increase the angle of attack of each wing-rotor to ascend and level off flight and we may decrease the angle of attack of each wing-rotor and descend and level off flight. If the wing-rotors are to be used as an air brake, both wing-rotors are raised simultaneously to increase the angle of attack and increase air resistance. In the embodiment shown in FIG. 5, jet engines are illustrated as well as a forward air intake 25 with a tapered or converging shaped nose 26B which will, in flight, direct air into four tapered or converging shaped ducts 26 and be directed through the converging channels 26 in the walls of the fuselage 10. The channels 26 in turn feeding into a compression chamber 26A which feeds the main compressor. Referring to FIG. 3 at the air intake 25, the airfoils 10C are primarily provided to give constant lift to the forward end of the fuselage. The air meeting the cone shape 26B is diverted and passes through the open channels 26 and passes over and around the freight and passenger compartment within the fuselage.

All air taken in the open front 25 of the fuselage 10 will be statically compressed by the converging conduits 26 as it guides the partially compressed air to the compression chamber 26A, where it is further compressed for use. After compressing the air, the conduit will guide the air to a compression chamber 26A. An air compressor (not shown) mounted within the fuselage 10 draws the compressed air from chamber 26A and further compresses it. The compressed air is then fed to the air intake (not shown) of the jet reaction engines to be mixed with fuel vapor that is injected into each engine to be consumed and provide the necessary propulsion.

Referring to FIG. 3, the mounting of the engines 22 and 23 is apparent and the manner of rotating the engines on their turntables 22A and 23A, is also apparent. The aircraft may also have a pair of engines 21 mounted either side of the fuselage 10 which are also rotatable on a vertical turntable 21A.

Figure 12:
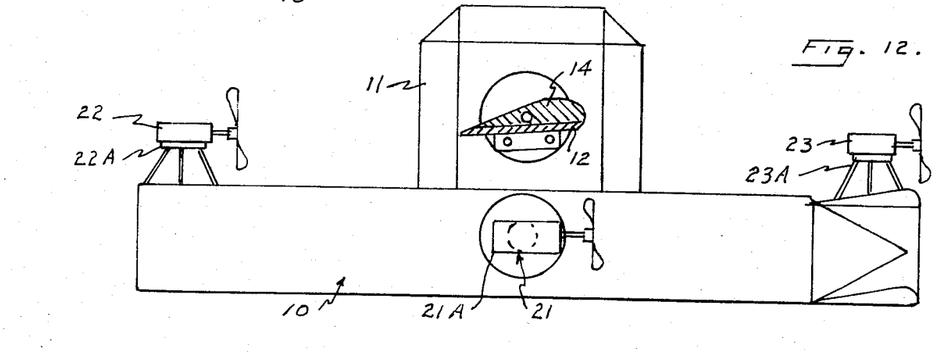
FIG. 12 is a view similar to FIG. 3 showing a further embodiment.
Figure 13:
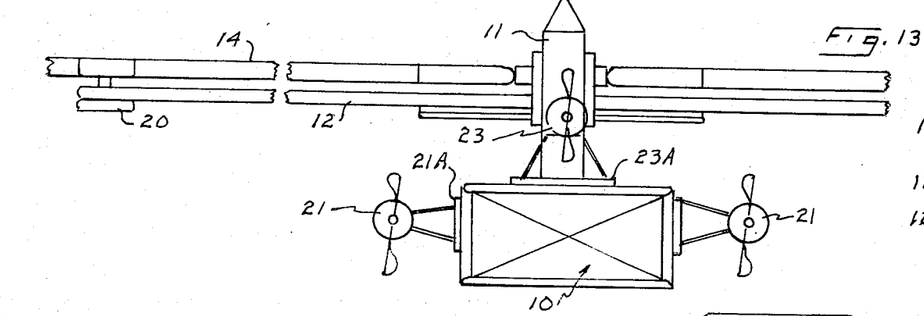
FIG. 13 is a view similar to FIG. 4 showing a further embodiment.

FIGS. 12 and 13 are similar to FIGS. 3 and 4 except for the nature of the engines which in this embodiment are internal combustion engines to drive props for propulsion, and further, in this embodiment with an internal combustion engine, the mounting of this type rotor engine 20 is moved to the base of the rotor to drive shaft 15.

Engines 21 (mounted on both sides of the fuselage) and engines 22 and 23 are mounted on a rotatable turntable base for directional control and reaction braking. The mounting of the spar 12 to the supporting structure 11 is also illustrated in FIGS. 3 and 4 where the spar is rotatably supported on a horizontal turntable that in turn is supported on a vertical turntable base, FIGS. 3, 4 and 7 so that the spar is rotatable and controlled by gear 12C to increase or decrease the angle of attack as required. The spars 12, that are rotatably mounted at 16 on a supporting turntable 12A, are also provided with a cam 16A (FIGS. 6 and 7) having a ring gear 16B and the ring gear 16B being in mesh with a pinion 17 which is driven by a shaft 17A. Thus by means of this drive, shaft 17A and pinion 17 can drive the ring gear 16B to move the spars 12 from their 90° position in relation to the tower 11 illustrated in FIGS. 1, 2, 3, 4, 6, 7 and 8 to a swept back position as illustrated in dotted lines in FIG. 1 and vice versa.

Figure 14:
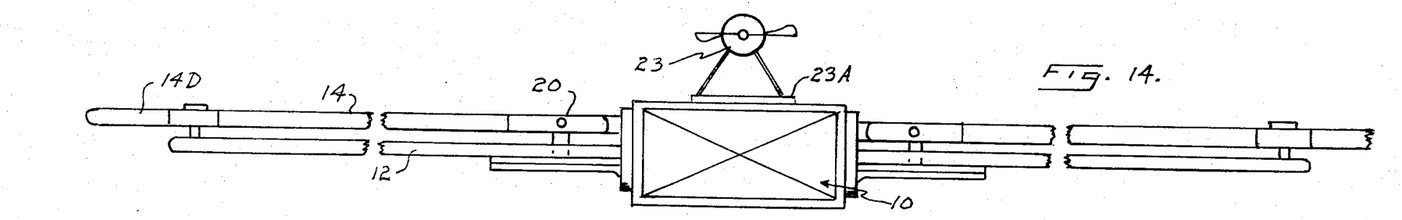
FIG. 14 is a further embodiment of a low wing aircraft according to this invention.

Referring to FIG. 14, there is illustrated a further embodiment of this invention in which the two wing-rotors and composite spars are mounted either side of a framework 9 attached to the fuselage 10A to form a low wing aircraft. In this embodiment any of the propulsion means (jet, electric motor or internal combustion engine driven propellors) may be used.

The aircraft being designed for vertical ascent and descent permits operating from a float, or a wheeled dolly rather than to be burdened with landing wheels or floats. The bottom of the aircraft may be designed to provide safe and sufficient support whether on land or water. The aircraft with its own engines after landing may maneuver to any desired spot for unloading of passengers and cargo.

With the components shown and described, properly instrumented and controllable as noted, the pilot will inspect the aircraft for flight readiness and safety. The wing rotors must be positioned at 90° (as shown in FIG. 1) in relation to the supporting structure 11 so that the wing rotors can be operated and the aircraft is then ready for vertical flight. With the fuselage 10 in a stationary position, the pilot will check and set the wing rotor engines 20 and front and rear engines 22 and 23. Synchronized rotation of the wing rotors 14 are then checked. A mechanical and/or electrical linkage is provided to produce and/or control synchronization of the rotors in the position as illustrated in FIG. 1. The angle of attack of both blades may be gradually increased to about 10°. With the predetermined R.P.M. of the rotors, there will be adequate lift and there will be an ascent of the aircraft The two side engines 21 and front and rear top engines 22 and 23 will provide the power for horizontal movement of the craft and control in any direction as it rises. In the ascent, with a direction of flight chosen, the vertical flight may be at an angle of 45°. When sufficient height has been reached for a transition from vertical flight to horizontal flight, the side and top engines will move the craft as directed and the angle of attack of the wing rotors increased to 35° to 40°. As the forward speed increases and the transitional point is reached, the transitional point at which the rotors may be stopped will depend upon the pilot, that is, the aircraft must have desired height, forward speed and flight angle. With the aircraft in the proper attitude and altitude proceeding forward at a desired speed and flight produced by rotating the spars as already described, the rotor blades must next be stopped by shutting off the rotor engines 20 and applying the magnetic brakes until the blades are in alignment with the spars 12. By means of the electro-magnets in the spar, the rotors may be locked to the spars in this position as illustrated in FIG. 2 and the rotor engines may be again started and they will be rotated to provide a rearward thrust to assist in the forward flight of the aircraft. The degree of lift or angle of attack of the wing is controllable by rotating the turntable spar support on shelf 12A (FIG. 7) mounted in the main supporting structure 11. For greater forward speed as the engines produce greater thrust, the spar wing-rotor combination may be synchronously swept backward as desired to reduce air resistance and permit greater speeds. The sweep back of the wing is thus controlled by the pilot to any desired degree. And, of course, the reverse of the ascent or take-off is the approach for a landing, that is, the spar 12 and rotor-wing must be in their 90° position as illustrated in FIG. 1 (a meter is provided (but not shown) to indicate alignment of both wings in their 90° position) the aircraft must ascend to a safe height for transition to vertical flight and descent. The thrust of the engines 20 must be reduced to a transitional point at which the wing rotors 14 may be released from their locked position. With the engines mounted at the end of the wing rotors and operating, the rotors will gradually attain a desired R.P.M. and produce adequate lift of the aircraft as the forward speed decreases and as the engines on the fuselage are reduced to a control stage, the rotors 14 will take over the descent and with engines 21, 22 and 23 controlled, there will be a gradual descent of the aircraft for a landing on land or water as already described.

Referring to FIGS. 6 and 7 it is to be noted that shaft 17B is provided with a clutch. There are clutches on either side of the reversible motor M2, thus by means of these clutches either rotor-wing (when in its 90° position may be rotated by shaft 17A to a downward or upward position, thus one rotor-wing may be tilted down and the opposite rotor-wing may be tilted up to provide a means of producing a turn while in flight. The rotor-wings are then returned to their synchronized similar positions for level flight control.

Referring to FIG. 6 it is to be noted that the spar 12 is the main support for the wing rotor 14 that is also used for vertical lift. Spar 12 is designed to present as little resistance as possible to the downward air movement produced by wing rotor 14 when operating. Spar 12 is also connected to a turntable support 12A and turntable gear 16B to permit a synchronized and controlled sweep back of the wing-rotors horizontally. Spar 12 is also provided with means, namely shaft 16 and the segment ring gear 16A to permit the sweep back of the wing-rotor from a 90° position for vertical flight to any position between 90° and 0° for swept back positioning for horizontal flight or for storage of the aircraft. The swept back positioning of the wing-rotors is synchronized mechanically as shown in FIG. 6, that is, shaft 17A extends through a motor M' to the opposite segment ring gear 16A of the opposite wing-rotor. Thus with the operation of motor M', the spars of each wing-rotor will be moved in synchronization. The angle of attack is controlled by the powered gear 17C rotating ring gear 12C and wing base 12B which supports spar base 12A. The wing-rotor is also provided with a plurality of electro-magnets 18 (FIGS. 6, 7 and 8). Each spar of the two wing-rotors is provided with arcuate shaped areas in which electro-magnets are mounted on their upper surface. The electro-magnets make magnetic contact with the under surface of the rotor so that when the magnets are energized, they gradually slow and finally stop the rotors when they reach a mating position above the spar, this position is mechanically assured by stop pin 42. When the rotor and spar are retained together, they form a perfect airfoil shaped wing-rotor. The magnets 18 are located on the top surface of both exterior edges of the spar as well as the arcuate shaped connecting legs 32. To control the braking action of the rotor 14, the portion 19 is formed of a magnetic material, the electro-magnets 18 are located on the upper surface of the spar along both exterior edges and on arcuate shaped legs 32 which align with the magnetic strips 19 of the rotor when the rotor is in a closed position over spar 12. Thus when the rotor is no longer required to serve as a rotor, but as a component of the wing for horizontal flight, it is returned to, and secured in, its proper location on spar 12 as follows: As shown in FIG. 6, wing rotor 14 rotates clockwise and its abrupt stopping is accomplished as follows: Utilizing magnetic increasing area contact brakes, plus mechanically locking of these brakes as the rotor complets its 180° degrees of rotation, it is slowed down by the magnetic forces and the wing tip friction brakes 40 and 41 to a full stop directly over and in alignment with the spar. In addition the stop pin 42 assures a positive stop.

This aircraft is designed to be rotor supported during ascent to and descent from any desired height for horizontal flight, and wing supported for normal horizontal flight, although it can be rotor supported during horizontal flight, with side and deck engines used for propulsion and directional control when this is necessary. It is also apparent that this aircraft is not constructed or designed for landing in any other pattern than the vertical descent which is the opposite pattern to its take-off.

It is to be noted that this aircraft is constructed without a tail assembly. It is readily apparent that all vertical flight is controllable with the rotating wing rotors and the rotatably mounted engines on the fuselage. It is also to be understood that the aerodynamic balance of the aircraft and the positioning of the propulsion power as well as the maneuverability of the engines provide complete control for any flying maneuver and for both vertical and horizontal flight.

In a further embodiment of this invention a motor-generator (M3) is added to shaft 15, FIGS. 6 and 7. Thus with the powered rotation of shaft 15, the motor-generator will produce a charging flow of electrical current to maintain all storage batteries fully charged. In addition, the motor-generator is designed as reversible to drive the rotors in one direction but to position the rotors in either direction to provide alignment of the rotors and spars. Both rotors should always be in synchronization. The motors M3 may also be used for the initial rotation of the rotors to assist the jet motors 20 in collecting a charge of incoming air for their normal operation. The motors M3 may also be used to assist in rotating the rotors to exact alignment with their mating spars when the rotors are stopped for horizontal flight.

Although we have described the components for an aircraft to produce vertical and horizontal flight, the dimensions of the rotors shall be determined by the weight of the aircraft and the lift generated by the rotors, that is, the greater the length and size of the rotor, the greater the lift that will be produced and of course with the elongation of the rotor, the spar must be similarly elongated to the desired length. And although we have illustrated a fuselage of a particular configuration, the shape may vary and although the fuselage is shown structurally affixed permanently to the superstructure, it is also to be considered that the fuselage may be detachable to permit release and pick up of another or different fuselage for expediency or varying purposes. This may vary as desired but the main supporting structure 11 must be retained or combined with the fuselage and although we have described engines to provide the necessary thrust for both vertical and horizontal flight, the positioning of the engines may vary, that is, the wing rotor may be driven by an engine at its rotational point or other means may be provided for producing the necessary forces for flight, such as compressed air or compressed gases may be used and either propellors or impellors may be used. Although no landing gear is shown as necessary, it is to be understood that supporting wheels or a floatation means may be used for maneuverability on land or water without departing from the spirit of this invention.

The invention described in detail in the foregoing specification is subject to changes and modifications without departing from the principle and spirit thereof. The terminology used is for purposes of description and not of limitation; the scope of the invention being defined in the claims.

What is claimed is:

1. An aircraft having both vertical and horizontal flight capabilities comprising a fuselage with component supporting structure, propulsion means carried by said fuselage and component supporting structure, structural spars supported, connected and positioned in balanced relationship on either side of said structure, said structural spars projecting substantially horizontally and outwardly from said supporting structure, each of said structural spars supported on a first horizontally positioned turntable, said horizontally positioned turntables each supported on a second vertical turntable, said vertical turntables rotatably affixed in opposed relationship on either side of said component supporting structure, each of said two structural spars including a third turntable at its extended free end, a freely rotatable balanced wing-rotor mounted on each third turntable, said wing-rotor being substantially the same peripheral contour and length as said structural spars and mounted with sufficient clearance to rotate above said structural spars, said wing-rotors provided with means to vary the angular tilt of the wing-rotor to increase or decrease the angle of attack of the leading edge during rotation, each of said wing-rotors having a propelling means to drive said wing-rotor about its turntable support, means to synchronize the rotation of both wing-rotors, means to control the R.P.M. of said wing-rotors and means to control the balance and direction of flight of the aircraft during the vertical lift created by the rotation of said rotors.

2. In a device according to claim 1 in which said fuselage is provided with a high wing component supporting structure.

3. In a device according to claim 1 in which said fuselage is provided with a low wing component supporting structure.

4. In a device according to claim 1 in which said fuselage is provided with jet engines, one on each side of said fuselage and a pair on top of the fuselage at the forward and tail ends and in which said engines are mounted on a turntable for pivotal movement to provide directional maneuverability to produce controlled directional forces during flights of the aircraft.

5. In a device according to claim 1 in which said fuselage is provided with internal combustion engines to drive propellers, one on each side of said fuselage and a pair on top of the fuselage at the forward and tail ends and in which said engines and propellers are mounted on a turntable for pivotal movement to provide directional maneuverability to produce controlled directional forces during flight of the aircraft.

6. In a device according to claim 1 in which said fuselage is provided with electrically driven motors to drive propellers, one on each side of said fuselage and a pair on top of the fuselage at the forward and tail ends and in which said engines and propellers are mounted on a turntable for pivotal movement to provide directional maneuverability to produce controlled directional forces during flight of the aircraft.

7. In a device according to claim 1 in which each structural spar and rotary connected wing-rotor is provided with braking means to stop the rotation of said wing-rotor and means to align said wing-rotor with said spar to form an airfoil for horizontal flight.

8. In a device according to claim 7 in which the means to brake the movement of said wing-rotors is a plurality of electro-magnets.

9. In a device according to claim 8 in which the means to stop the rotation of said wing-rotors includes the scissor-like movement of the wing rotor in relation to the spar and in which said magnets are mounted in the spars to produce a braking magnetic force upon the rotor and in which this force is produced in a gradual increasing manner due to the spaced mounting of the magnets over the gradual increasing surface contact between the wing rotor and the stationary spar.

10. In a device according to claim 7 in which the means to stop the rotation of said wing-rotors includes a friction brake that is applied to the end of the wing-rotor and means to apply the friction brake in a gradual and increasing effect.

11. In a device according to claim 1 in which each wing-rotor is connected to a motor-generator, said motor-generator connected to batteries to store energy during the rotation of said wing-rotors and said motor-generators operable to drive said wing-rotors when an auxiliary drive is required.

12. In a device according to claim 7 in which the stopping of the rotation of the wing-rotors is made positive by the inclusion of a mechanically projectable stop pin to bar further rotation.

13. In a device according to claim 7 in which said airfoils are normally substantially 90° to the axis of the fuselage and means to pivotally move said airfoils in synchronization backward to a swept wing formation to reduce the frictional resistance of the aircraft in flight and means to move said airfoils further backward after landing to an aligned position for storage of the aircraft.

14. In a device according to claim 1 in which the propelling means for said wing-rotor is an engine at the free end of said wing-rotors and in which said engine is rotatable from its fixed position after the rotation of the wing-rotor is stopped to provide a propelling force in 360° of rotation to permit adding this force for maneuverability.

15. In a device according to claim 1 in which the vertical lift of the aircraft is produced by the rotation of the wing rotors and forward flight is produced by the thrust of propulsion engines and said structural spars are provided with means to stop the rotation of said wing-rotors, and means to form airfoil wings with the combination of said spars and wing-rotors in a locked integral relationship for a transition to horizontal airfoil supported flight and said propulsion engines providing the thrust for forward horizontal flight.

16. In a device according to claim 15 in which said fuselage is provided with means to direct air while in flight through a funnel shaped duct to provide a converging compression of air flowing to a storage chamber to provide pre-compressed air for said jet engines.

17. In a device according to claim 15 in which said fuselage is provided with airfoils at its nose end to assist in the maneuverability of the aircraft.

18. In a device according to claim 1 in which all engines are reversible to produce an opposite reactive force.

19. In a device according to claim 1 in which the lift and thrust vector is vertical for a straight upward take-off due to the vertical rotation of the wing-rotors and means to introduce directional flight by changing the thrust vector of the wing-rotors with a tilting of the wing-rotors.

20. In a device according to claim 1 in which said wing-rotors may be disengaged from their normal synchronized movements and each wing-rotor may be rotated separately on its second turntable to increase or decrease the angle of attack of said wing-rotor for maneuvering the flight of said aircraft.

21. In a device according to claim 1 in which said propelling means for said wing-rotors are jet engines and in which said jet engines are mounted at the tip of said rotors to provide a rotative force to drive each rotor and in which the rotation of each rotor provides a flow of air through a funnel shaped mouth of said jet engine to be fed by convergence and compression to said jet engine to be mixed with a fuel feed and ignited for power and means to control the R.P.M. of said wing-rotors.

* * * * *